United States Patent
Griffin, Jr.

(10) Patent No.: US 8,160,643 B2
(45) Date of Patent: Apr. 17, 2012

(54) RADIO ACCESSORY HAVING PASS THROUGH CONNECTOR

(75) Inventor: Paul P. Griffin, Jr., Nashville, TN (US)

(73) Assignee: Griffin Technology, Inc., Nashville, TN (US)

( * ) Notice: Subject to any disclaimer, the term of this patent is extended or adjusted under 35 U.S.C. 154(b) by 157 days.

(21) Appl. No.: 12/540,373

(22) Filed: Aug. 13, 2009

(65) Prior Publication Data

US 2010/0041363 A1 Feb. 18, 2010

Related U.S. Application Data

(63) Continuation-in-part of application No. 11/388,037, filed on Mar. 23, 2006, now abandoned.

(51) Int. Cl.
*H04B 1/08* (2006.01)
(52) U.S. Cl. ..................... 455/557; 455/556.1
(58) Field of Classification Search .................. 455/348, 455/349, 350, 557, 558
See application file for complete search history.

(56) References Cited

U.S. PATENT DOCUMENTS

| | | | | | |
|---|---|---|---|---|---|
| 3,916,122 | A | * | 10/1975 | Sato et al. | 455/349 |
| 4,194,157 | A | * | 3/1980 | Uno | 455/348 |
| 4,807,292 | A | * | 2/1989 | Sorscher | 455/346 |
| 5,146,618 | A | * | 9/1992 | Wenner | 455/350 |
| 2002/0173339 | A1 | * | 11/2002 | Safadi | 455/557 |
| 2005/0255895 | A1 | * | 11/2005 | Lee et al. | 455/573 |

* cited by examiner

*Primary Examiner* — Lana N Le
(74) *Attorney, Agent, or Firm* — Hornkohl Intellectual Property Law, PLLC; Jason L. Hornkohl

(57) ABSTRACT

A radio accessory for a portable electronic device, such as a digital music player, includes a connector that allows the radio to use accessories designed to couple with the portable electronic device. In addition, the radio includes a pass through connector that allows the radio to couple to the portable electronic device and accessory at the same time such that signals are transferred from the accessory to the portable electronic device through the radio. The radio preferably has a power supply and audio output such that it can function as a stand alone device. The radio can be configured to receive AM, FM or satellite broadcasts. The accessory is preferably a speaker dock designed to receive the portable electronic device.

5 Claims, 3 Drawing Sheets

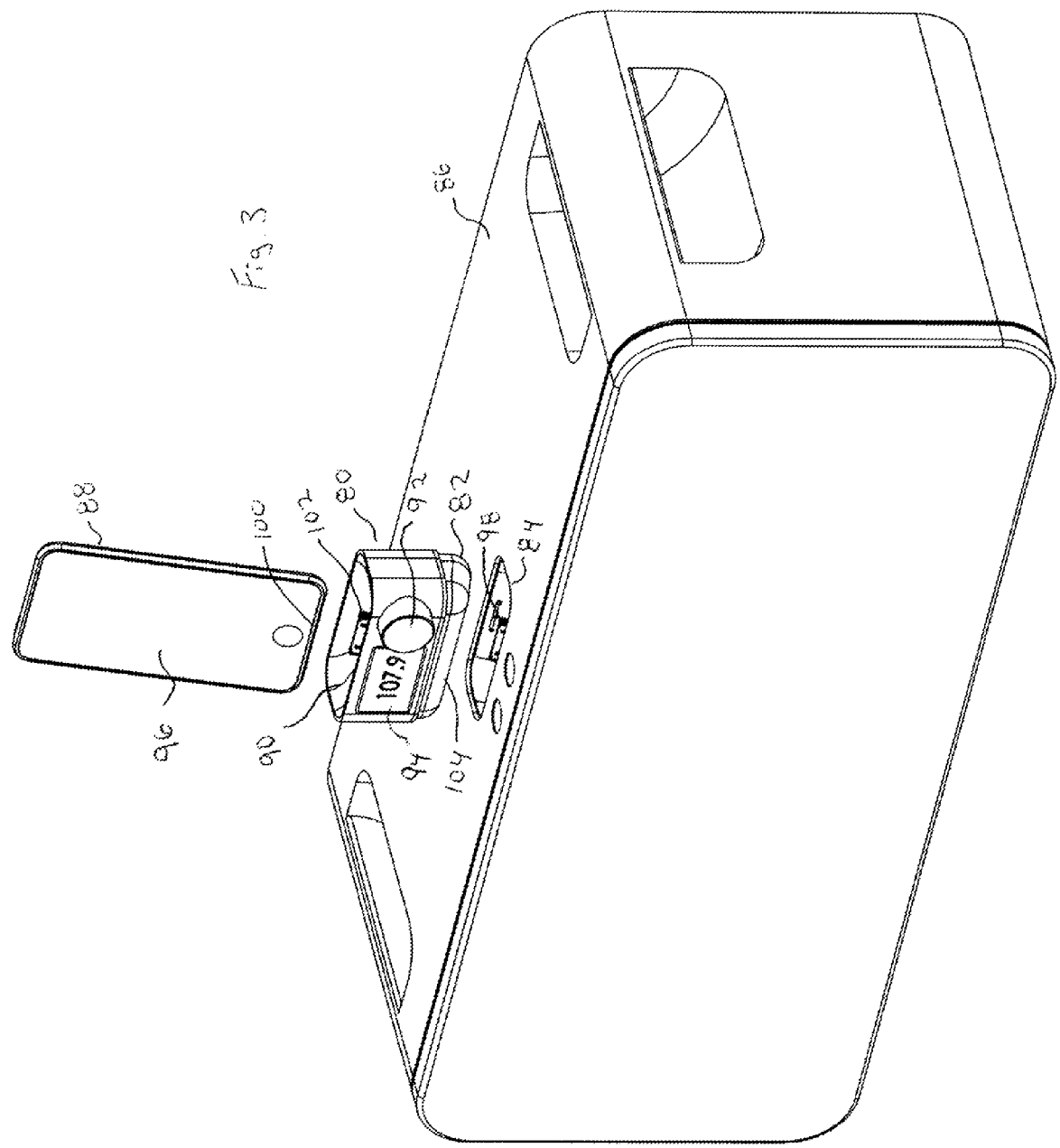

RADIO ACCESSORY HAVING PASS THROUGH CONNECTOR

CROSS-REFERENCES TO RELATED APPLICATIONS

The present application is a continuation-in-part of, and claims priority from, U.S. patent application Ser. No. 11/388,037 filed Mar. 23, 2006 now abandoned.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

FIELD OF THE INVENTION

The present invention is generally directed toward the field of accessories for portable electronic devices. More particularly, an embodiment of the present invention is directed toward a radio accessory for a portable electronic device that is adapted to work with accessories such as speaker docks designed for use with the portable electronic device.

BACKGROUND OF THE INVENTION

Digital music players, such as the Apple iPod™, have become increasing popular in recent years. As these devices have increased in popularity, a wide range of accessories have been created for use with these players. For example, chargers, FM transmitters, radios, external speakers, headphones, flashlights, etc. have been created for use with digital music players. These accessories typically connect to a proprietary connector on the digital music player. Unfortunately, once one accessory is coupled to the music player's connector, there is no room to connect another accessory to the player. In addition, since the accessories use the proprietary connector to couple to the digital music player, the accessories can typically not be used in connection with any other device. Therefore, what is needed is an improved method of coupling an accessory to a digital music player.

Radios have been designed for use in connection with digital music players. Typically, the radio is coupled to the proprietary connector on the digital music players. Unfortunately, this prevents any additional accessories from being coupled to the digital music player. In addition, these radio's typically can not be used separate from the digital music player and often require there own set of accessories such as chargers, FM transmitter, speakers, etc. Therefore, what is needed is an improved radio accessory for a digital music player.

BRIEF SUMMARY OF THE INVENTION

An embodiment of the present invention is directed toward a radio accessory for use with a portable electronic device. The radio accessory includes a receiver for receiving and demodulating a radio signal and producing an audio output. The radio accessory operates in accordance with one of an AM, FM or XM broadcast format. A first connector on the accessory is adapted to couple the accessory to the portable electronic device. A second connector is included that is adapted to couple the radio accessory to a device accessory, such as a charger for recharging a power supply of the portable electronic device, designed for use with the portable electronic device such that the radio accessory and the portable electronic device can utilize a function of the device accessory. One of the first and second connectors is preferably a male 30-pin docking connector and the other a female 30-pin docking connector. The radio accessory has an internal power supply and an audio output such that the radio accessory can be used without being coupled to the portable electronic device or the device accessory. The radio preferably can communicate with operating software of the device such that the radio can control functions of the device or vice versa.

Another embodiment of the present invention is directed toward an FM radio receiving accessory for use with a portable electronic device having a device input/output connector and a speaker system having a speaker input/output connector in a device dock that is configured to receive the portable electronic device. The FM radio receiving accessory includes an FM receiver for receiving and demodulating an FM radio signal and producing a radio audio output. An upper housing is shaped to receive and support the portable electronic device in an upright manner when the portable electronic device is mounted on the upper housing. A first connector is positioned on the upper housing that is adapted to couple the FM radio receiving accessory to the device input/output connector. A lower housing is shaped to fit in the device dock on the speaker system. A second connector is positioned on the lower housing that couples the FM radio receiving accessory to the speaker input/output connector such that the radio audio output is coupled to the speaker input/output connector. The FM radio receiving accessory can selectively transfer the radio audio output or a device audio output to the speaker system. The FM radio receiving has an internal power supply and an audio output such that the FM radio receiving accessory can be used as a radio receiver without being coupled to the portable electronic device or the device accessory.

Yet another embodiment of the present invention is directed toward a method of connecting a portable electronic device to a radio receiver. In accordance with the method, a first input/out connector of the radio receiver is coupled to an input/output connector of the portable electronic device. Electrical access to the input/output connector of the portable electronic device is provided through a second input/output connector positioned on the radio receiver. A power charger is coupled to the radio such that the charger charges the portable electronic device when the portable electronic device is coupled to the radio. Preferably, the power signal is received with the second input/output connector and provided from the radio receiver to the portable electronic device through the first input/output connector. The radio's first input/out connector is the same type of connector as the portable electronic device's input/output connector.

BRIEF DESCRIPTION OF THE SEVERAL VIEWS OF THE DRAWINGS

FIG. 3 is an illustration of a radio accessory for a use with speaker system having a device dock and a portable electronic device in accordance with an embodiment of the present invention.

DETAILED DESCRIPTION OF THE INVENTION

Figure 1:
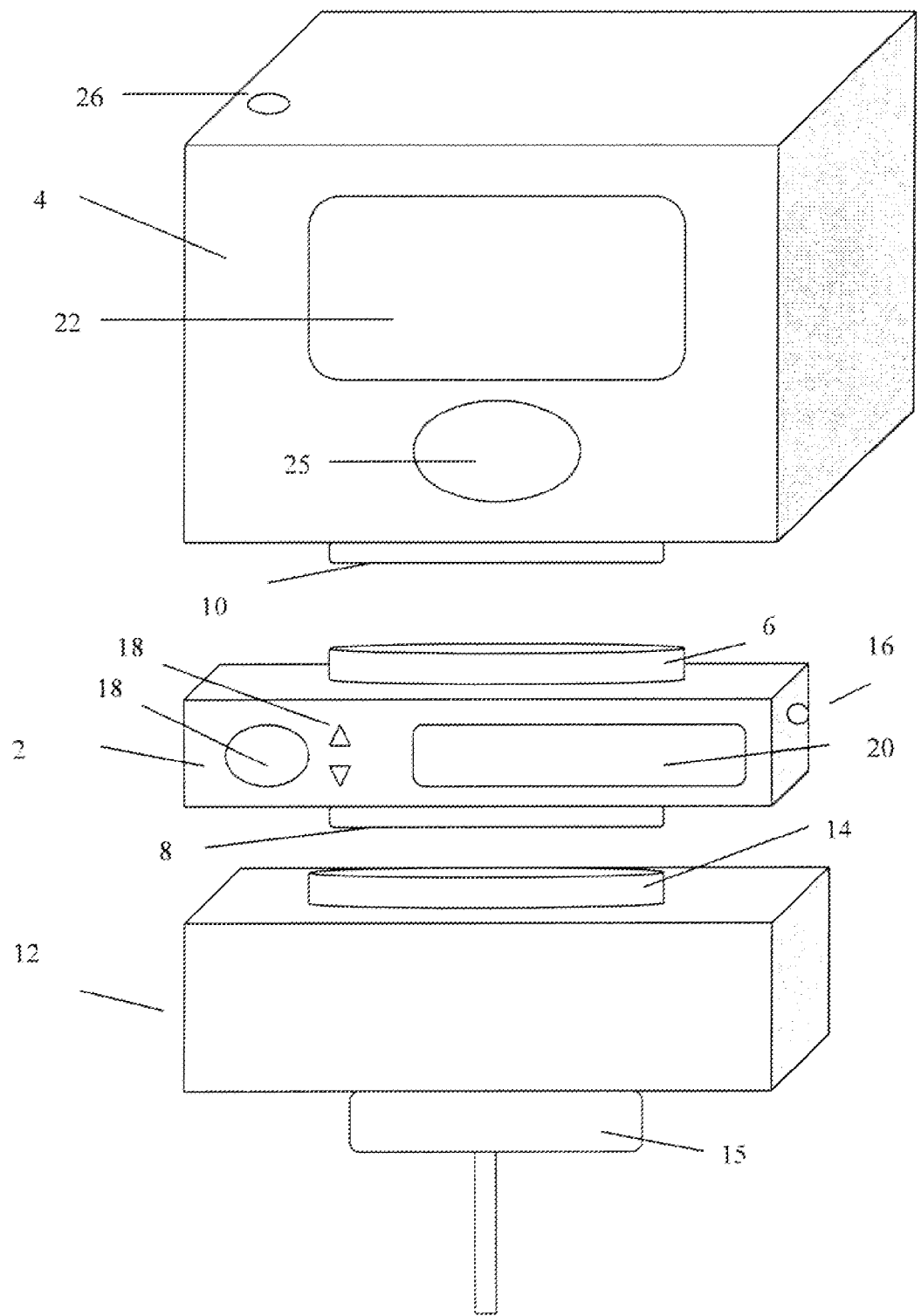
FIG. 1 is an illustration of a docking radio accessory for a portable electronic device having a pass through connector in accordance with an embodiment of the present invention.

Referring now to FIG. 1, an illustration of a docking radio 2 for a portable electronic device 4 having a pass through connector in accordance with an embodiment of the present invention is shown. The radio 2 has two connectors 6 and 8. The first connector 6 is designed to be connected to the docking connector 10 of the portable electronic device 4. The docking connector 10 of the portable electronic device 4 is adapted to mate with various accessories for the portable electronic 4 device such as chargers or FM transmitters. When the radio 2 is connected to the portable electronic device through the connector 6, the radio 2 provides the device 4 with the ability to broadcast audio signals received from the radio 2 over the device's headphones, speakers or audio outputs. The docking radio 2 also includes a second connector 8 that is the same as the portable electronic device's docking connector 10 and, thus, is designed to mate with a connector such as the first connector 6. The second connector 8 is preferably spaced a distance away from the first connector 6 such that the radio 2 can have devices attached to both the first and second connectors 6 and 8 at the same time. This allows the radio 2 to be coupled to a connector 14 of an accessory 12, such as a charger, for the digital music player at the same time it is coupled to the device 4 itself. In such a configuration, the portable electronic device 4 may be connected to the accessory 12 through pass through connections in the radio 2. For example, power may be provided from a charger 12 that is coupled to a power source through a cable 15 to the device 4 through the radio 2. In addition, a signal from the device 4 may be provided from the device 4 to the accessory 12 through the radio 2. For example, an audio signal from the device maybe coupled to an FM transmitter through the radio such that the audio signal is broadcast.

The radio 2 also preferably has its own internal power source and audio output 16 for headphones or speakers such that it can be used independently of the portable electronic device 4 and accessories 12 that it is designed to work with. In such an embodiment, a user could simply plug a set of headphones into the audio output 16 radio 2 and listen to any available stations. Alternatively, the signal received by the radio 2 can be sent from the radio to the audio output 26 of the device 4. The power source is preferably a rechargeable battery that is charged whenever the radio 2 is connected to an external power source such as either the device 4 or the accessory 12. The radio 2 also has a set of user inputs 18 and a display 20 that allow a user to tune the radio to particular station or frequency. Alternatively, as discussed in more detail below, the radio 2 can use a display 22 of the portable electronic device 4 to display the selected station by sending a set of control codes to the portable electronic device 4 that allow the radio to assume control of the device's display 22. Of course, in such an embodiment, the radio 2 must be able to interface with the operating software of the portable electronic device 4. The software can also allow the user inputs of the radio 2 to control functions of the device 4 that are usually controlled with the device's user inputs 25.

Figure 2:
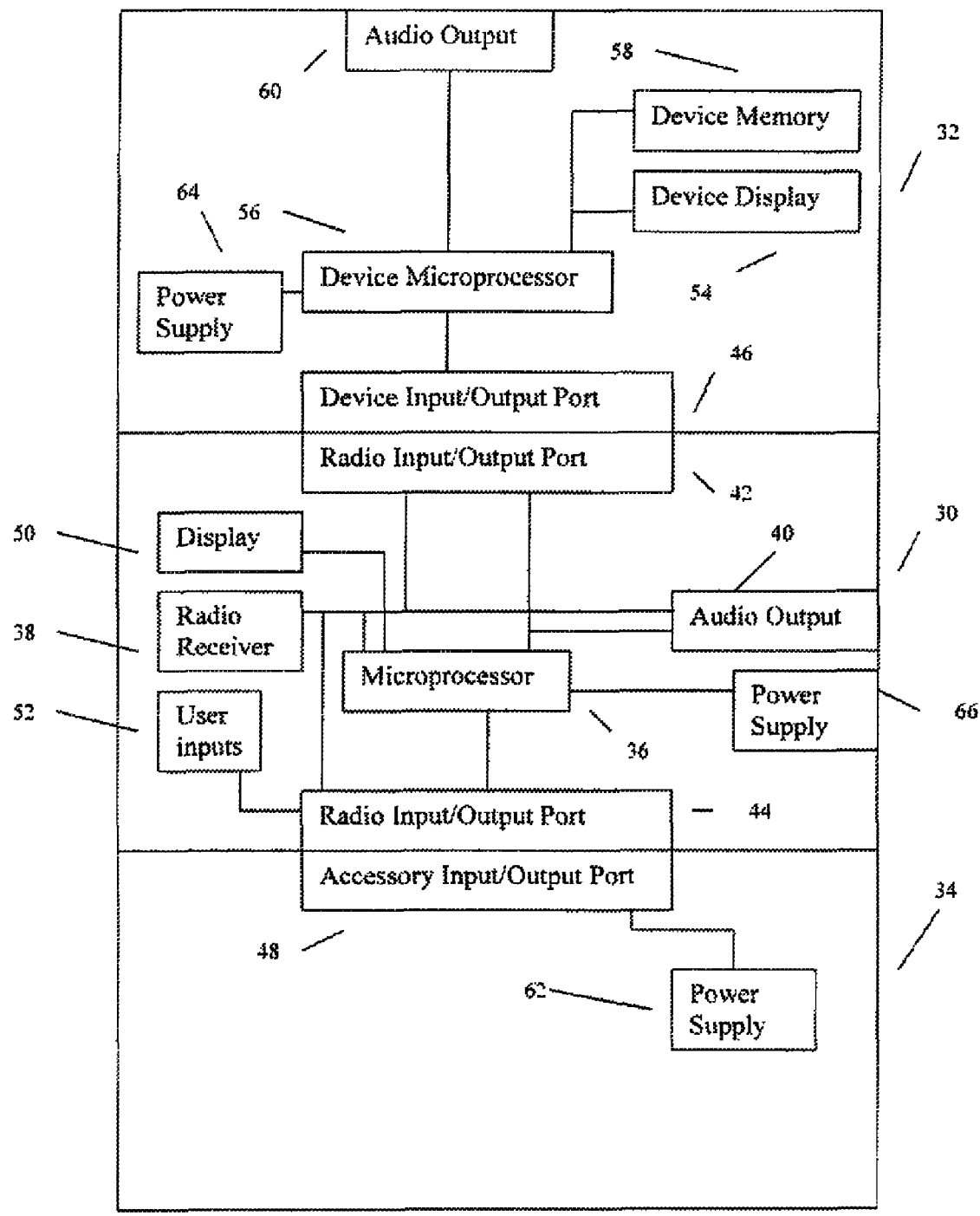
FIG. 2 is a block diagram of a radio accessory for a portable electronic device having a pass through connector in accordance with an embodiment of the present invention.

Referring now to FIG. 2, a block diagram of a radio accessory 30 for a portable electronic device 32 that is adapted to couple to an accessory 34 designed to be used with the portable electronic device is shown. The radio accessory 30 is preferably controlled by a microprocessor 36. The radio 30 receives broadcasts signals with a receiver 38. These broadcasts can be in an AM, FM or satellite radio format depending upon the particular application. The output of the receiver 38 is preferably provided to an audio output 40, a set of radio input/output ports 42 and 44 and the microprocessor 36.

The radio's input/output ports 42 and 44 are used to transfer signals between the radio 30, the device 32 and the device accessory 34. The device's input/output port 46 is configured to receive a mating connector such as the input/output port 48 utilized by the accessory 34. The radio 30 is provided with an input/output port 42 that is the same as the accessory's input/output port 48 so that it can be coupled to the device's input/output port 46. In addition, the radio 30 has a second input/output port 44 that is the same as the device's input/output port 46 that allows the radio to be coupled to any accessory that is designed to couple with the device's input/output port 46. Thus, the radio 30 can be coupled with both the device 32 and the device's accessory 34 at the same time. The radio 30 couples selected contacts from it input/output port 44 to its input/output port 44. This allows signals from the accessory 34 to be transferred to and from the device 32 through the radio 30. For example, a power supply signal from a charging accessory 34 can be transferred from the accessory 34 to the device 32 through the radio 30.

A radio 30 constructed in accordance with an embodiment of the present invention may contain a number of different features depending upon the particular application in which it is being used. A set of user inputs 52 allow a user of the radio to select the frequency to receive and various other functions such as the output volume, etc. A display 50 on the radio provides information to a user such as the frequency of station selected. Alternatively, the radio's microprocessor 36 can be used to alter the display of the device to indicate information such as the selected station or volume. In such an embodiment, the microprocessor 36 has access to control routines that allow it to communicate with the device's microprocessor 56 and interact with the software of the portable electronic device 32 to alter its display. The radio 30 can supply audio signals to the device 32 that are stored in the device's memory 58 or provided to all audio output 60 of the device.

One of the most popular accessories 34 for a portable electronic device 32 is a power charger. The radio's pass through connectors 42 and 44 allow such a charging accessory 34 to be used with the device 32 while the device 32 is coupled to the radio 30. The radio 30 passes the power signal received from the accessory's power supply 62 to the device such that the device's power supply 64 can be charged. In addition, the radio 30 preferably has an internal power supply 66 that can also be charged with the power signal received from the accessory that communicates with the device 24 through a radio input/output port 38 connected to cable 32 which couples to the device's input/output port 30 through a connector.

FIG. 3 is an illustration of a radio accessory 80 for a use with speaker system 86 having a device dock 84 and a portable electronic device 88 in accordance with an embodiment of the present invention. The radio accessory 80 has a lower housing 82 that is shaped to be received in a device dock 84 of a speaker system 86 that is designed to receive a portable electronic device 88 such that music playing on the device 88 is broadcast over speakers contained in the housing of the speaker system 86. The radio accessory 80 has an upper housing 90 that is shaped to receive the portable device 88. The upper housing 90 is also shaped to hold the portable device 88 in an upright manner so that the display and controls of the device 88 can be manipulated while the device is mounted in the radio accessory 80 and the radio accessory 80 is mounted in the device dock 84. In the embodiment shown the portable device 88 has a touch screen 96 it uses for control and display functions. In addition, the accessory 80 has a tuner control 92 and display 94 that can be used to control a radio receiver contained with the accessory 80. The receiver of the accessory 80 can also preferably be controlled by the touch screen 96 of the portable device 88.

The device dock 84 of the speaker system 86 has a connector 98 that was selected to mate with a connector 100 on the bottom of the device 88. The radio accessory 80 has a connector 102 in the upper housing 90 that corresponds to the dock connector 98. The lower housing 82 of the accessory 80 has a connector 104 that corresponds to the connector 100 on the bottom of the device 88. The accessory connectors 102 and 104 allow the accessory 80 to transfer the control signals from the device 88 to speaker system 86 that would normally be provided when the device 88 is mounted in the dock 84 even when the accessory 80 is mounted in the dock 84 and the device mounted in the upper housing 90 of the accessory. In addition, the connectors 102 and 104 allow the accessory 80 to transmit the signals necessary for the radio receiver in the accessory 80 to broadcast the received radio signal over the speaker system 86 and use the controls of the device 88. These signals include but are not limited to audio signals, power supply connections, controls codes and digital data discussed above.

While the particular designs discussed above with respect to the figures are preferred, it will be readily appreciated by those skilled in the art that embodiments of the present invention can take many forms and that the embodiments shown are exemplary only. Thus, although there have been described particular embodiments of the present invention of a new and useful Radio Accessory Having Pass Through Connectors, it is not intended that such references be construed as limitations upon the scope of this invention except as set forth in the following claims.

What is claimed is:

1. An FM radio receiving accessory for use with a portable electronic device having a device input/output connector and a speaker system having a speaker input/output connector in a device dock that is configured to receive said portable electronic device, said FM radio receiving accessory comprising:

an FM receiver for receiving and demodulating an FM radio signal and producing a radio audio output;

an upper housing shaped to receive and support said portable electronic device in an upright manner when said portable electronic device is mounted on said upper housing;

a first connector positioned on said upper housing, that is adapted to couple said FM radio receiving accessory to said device input/output connector;

a lower housing shaped to fit in said device dock on said speaker system; and a second connector positioned on said lower housing that couples said FM radio receiving accessory to said speaker input/output connector such that said radio audio output is coupled to said speaker input/output connector;

wherein said FM radio receiving accessory can selectively transfer said radio audio output or a device audio output to said speaker system; and wherein said speaker system further comprises a charger for recharging a power supply of said portable electronic device and said FM radio receiving accessory couples a power supply of said speaker system to said power supply of said portable electronic device.

2. The FM radio receiving accessory of claim 1 further comprising a satellite radio receiver.

3. The FM radio receiving accessory of claim 1 wherein one of said first and second connectors is a male 30-pin docking connector and the other is a female 30-pin docking connector.

4. The FM radio receiving accessory of claim 1 further comprising an internal power supply and an audio output such that said FM radio receiving accessory can be used as a radio receiver without being coupled to said portable electronic device or said device dock.

5. The radio accessory of claim 1 wherein said FM receiving accessory further operates in an AM broadcast format.

\* \* \* \* \*